United States Patent [19]

LaBranche

[11] 4,040,651
[45] Aug. 9, 1977

[54] SELF-LOCKING PIPE COUPLING

[75] Inventor: Harvey W. LaBranche, Olympia, Wash.

[73] Assignee: Western Plastics Corporation, Tacoma, Wash.

[21] Appl. No.: 663,466

[22] Filed: Mar. 3, 1976

[51] Int. Cl.² ............................................. F16L 17/00
[52] U.S. Cl. .................................... 285/113; 285/423
[58] Field of Search ............... 285/113, 339, 423, 374, 285/110, 323, 345, 307, 232, 230, 231, DIG. 11; 277/207 A, 117, 190; 403/374, 404, 409

[56] References Cited

U.S. PATENT DOCUMENTS 2,837,353 6/1958 Ashbrook ........................ 285/113 X
3,127,196 3/1964 Fabian et al. ..................... 285/113 X
3,204,988 9/1965 Ouderkirk et al. .............. 285/113 X Primary Examiner—Dave W. Arola
Attorney, Agent, or Firm—Lawrence E. Laubscher

[57] ABSTRACT

A self-locking pipe coupling for joinder of adjacent end segments of pipe comprises a bell at one of the adjacent ends, a spigot at the other adjacent end and a wedge-shaped seal configured to fit over the spigot and within the bell. The angle of the seal, the coefficient of friction between the seal and the bell, and the coefficient of friction between the seal and the spigot are chosen relative one another selectively in a manner to prevent disassembly of the coupling once it is assembled without destruction of the seal.

2 Claims, 8 Drawing Figures

U.S. Patent     Aug. 9, 1977     4,040,651
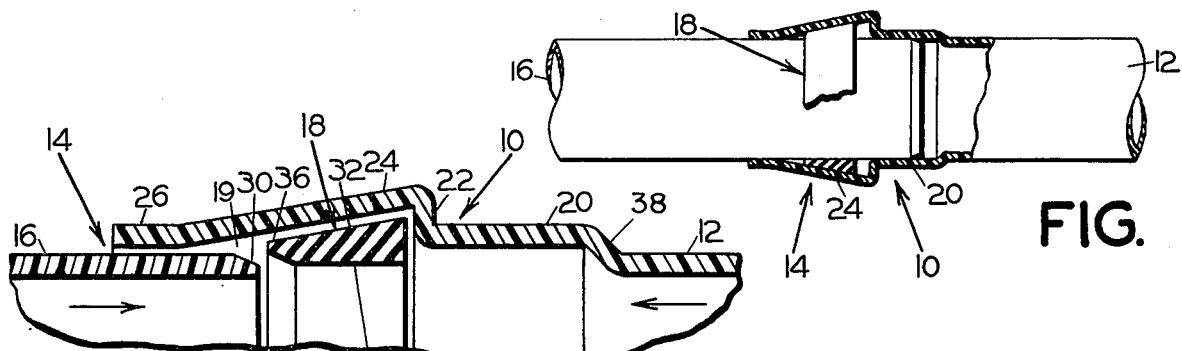
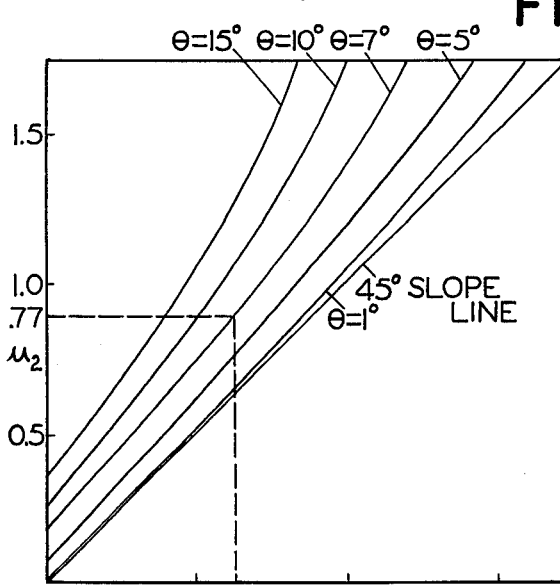
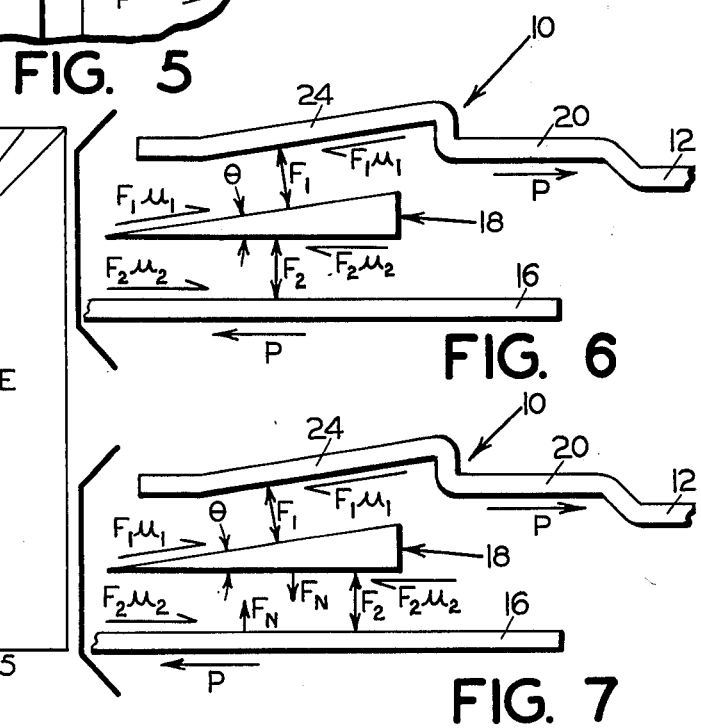

SELF-LOCKING PIPE COUPLING

BACKGROUND OF THE INVENTION

This invention relates to a pipe coupling for joinder of adjacent end segments of pipe. It pertains particularly to such a coupling which self locks upon assembly to prevent subsequent disassembly of the segments.

In joinder of lengths of pipe end to end to form a long run of pipe, particularly pipe fabricated from plastics such as polyvinylchloride, no completely satisfactory means has been devised to join the end segments of the pipe. Heretofore, the most common method of joining lengths of plastic pipe consists of applying a coating of cement to the peripheral end portion of one of the lengths and inserting that length into an enlarged bell at one end of the other length. The two lengths are then coupled when the cement dries.

Cement has the disadvantage that good workmanship is necessary to form a reliable coupling. On large pipes the time required to apply the cement and assemble the lengths of pipe may result in partial drying of the cement before assembly. Thus the joint is not completely formed. Repair in this event is impossible since the cement that has bonded prevents separation of the two sections.

Another common method of joining pipe lengths is by use of an elastomeric seal, such as an O-ring gasket. The seal is placed in a grooved recess located at the entrance of an enlarged bell section in the end of one of the pipe lengths. The adjoining length is then inserted into the enlarged bell end, compressing the seal so that a leak-proof connection is made.

An O-ring seal is more reliable than a cement joint. However, it will not resist end thrust, so blocking must be provided at a bend or any place where internal pressure results in the application of an axial load across the joint. Therefore, the use of this type of coupling results in additional expense in installation of the pipe.

The use of a pliable seal which relies on a differential in the coefficient of friction between its outer surface and its inner surface to allow wedging of the seal between the lengths of pipe when separation of the joined lengths of pipe is attempted is known in the prior art. In particular, U.S. Pat. No. 3,064,983 teaches this concept.

However, the prior art pipe couplings using a seal of this type have relied on a large difference in the coefficient of friction between the inner and outer surfaces of the seal. This difference often must be in the order of 4 to 1 in order to properly deform and seat the seal. It is difficult to find a material which can be surface-treated in a manner to provide this large a difference in coefficient of friction. Therefore, the prior art couplings generally utilize a seal which is made from two different materials. Even when such differences can be provided in a single material, it is difficult and expensive. In addition, special care in storage and handling is required to prevent loss of these properties due to age and weathering.

The present invention consists of the selection of a combination of materials and design constants in a pipe coupling so that a moderate difference in the coefficients of friction on the two surfaces of a seal used in the coupling will insure satisfactory self-locking operation. Therefore, the seal may be fabricated out of a single material, relying upon surface treatment of one of its sides to give the proper coefficient of friction.

Accordingly, it is the general purpose of the present invention to provide a pipe coupling for joining lengths of pipe which permits easy assembly of the pipe parts, but which prevents separation once they are assembled.

It is a further purpose of the present invention to provide a pipe coupling for joining lengths of pipe which does not require special skills to install.

It is a further purpose of the present invention to provide a pipe coupling for joining lengths of pipe which will join and seal the pipe lengths simultaneously.

It is a further purpose of the present invention to provide a pipe coupling for joining lengths of pipe which is self-locking, preventing disassembly of the lengths of the pipe without destruction of the seal.

It is a further purpose of the present invention to provide a pipe coupling for joining lengths of pipe wherein the seal can be fabricated from a common, low cost, rubber type material.

It is a further purpose of the present invention to provide a pipe coupling for joining lengths of pipe wherein the coupling properties are not lessened due to weathering or extended underground placement.

It is a further purpose of the present invention to provide a pipe coupling for joining lengths of pipe not requiring special storage or handling procedures before use.

THE DRAWINGS

The manner in which the foregoing and other objects of the invention are accomplished will be apparent from the accompanying specification and claims, considered together with the drawings wherein:

FIG. 1 is a fragmentary plan view, partially broken away, of the pipe coupling of the present invention;

FIGS. 2-5 are fragmentary cross sectional views showing the sequence of assembly of the pipe coupling;

FIG. 6 is a diagrammatic view showing the forces developed in the application of one embodiment of the pipe coupling;

FIG. 7 is a diagrammatic view similar to that of FIG. 6 showing the forces developed in the application of another embodiment of the pipe coupling; and FIG. 8 is a graphical representation showing the frictional characteristics of the first embodiment of the pipe coupling as a function of the angle of a seal used therein.

GENERAL STATEMENT OF THE INVENTION

The pipe coupling of the present invention broadly comprises a bell located at the end of one length of pipe including a wedge-shaped socket with an inner surface inclined at an angle $\theta$, a spigot located at the end of an adjacent piece of pipe configured for free sliding insertion within the bell, and a wedge shaped seal configured to fit over the spigot and within the socket of the bell. The seal comprises an outer surface inclined at the angle $\theta$ and a radial inner surface configured for sliding engagement with the spigot.

The outer coefficient of friction $\mu_1$, between the seal and the bell, is less than the inner coefficient of friction $\mu_2$, between the seal and the spigot, by an amount which is sufficient to satisfy the relationship $$\mu_2 \geqq \frac{\sin\theta + \mu_1 \cos\theta}{\cos\theta - \mu_1 \sin\theta},$$

thus self-locking the lengths of pipe once they are installed in one another with the seal in position.

DETAILED DESCRIPTION OF A PREFERRED EMBODIMENT

Referring to FIG. 1 of the drawings, the pipe coupling of the present invention basically comprises a bell 10 located at the end of one length of pipe 12, a spigot 14 located at the end of an adjacent length of pipe 16 configured to fit within the bell, and a wedge shaped seal 18 configured to fit over the spigot and within the bell.

The bell forms a wedge-shaped socket 19 which includes an inner portion 20 having a longitudinally constant diameter larger than the diameter of the pipe 12 from which it is formed. Preferably, the inner portion is approximately one pipe diameter in length. Located at the forward or longitudinally outward extremity of the inner portion, step 22 extends radially outwardly in a direction substantially normal to the center line of the pipe.

An inclined surface 24 angles radially inwardly at angle $\theta$ from the outer extremity of the step to a point at which it has an inner diameter slightly larger than the outer diameter of the pipe. The angle $\theta$ generally is shallow, preferably in the 5°-10° range, as will be explained more fully later. The terminal portion 26 of the bell extends forwardly from the forward end of the inclined surface at a constant diameter. When used in pipes formed from thermal setting plastic material, such as polyvinylchloride, the bell can be formed by an expanding mandrel or other suitable forming techniques.

The spigot 14 basically is an extension of the pipe 16 and includes a peripheral chamfer 30, at its leading end. Preferably, the pipe 16 is the same diameter as the pipe 12 so that the spigot will fit freely within the terminal portion 26 of the bell. Generally, the bell will be formed in one end of a length of pipe and the spigot at its opposite end so that several lengths of pipe may be joined end to end.

Seal 18 comprises a wedge shaped annulus having an inclined outer surface 32 at angle $\theta$ and a constant diameter inner surface 34. The apex 36 of the seal is truncated and chamfered to allow ease of installation of the spigot without damaging it. The seal is fabricated from a pliant material, preferably one of the low cost rubber compounds.

The seal has an outer coefficient of friction $\mu_1$ (between the outer surface 32 of the seal and the inner portion 24 of the bell) which is less than the inner coefficient of friction $\mu_2$ (between the inner surface of the seal and the spigot). For this purpose, two materials may be used in constructing the seal.

However, preferably the seal is constructed from a single material and one side is surface treated to give it the proper coefficient of friction. Either a spray lubricant can be applied to the outer surface or a friction increasing material may be applied to the inner surface for this purpose. For optimum results and ease of fabrication the ratio of $\mu_1$ to $\mu_2$ should be approximately 0.70 to 0.90. The effect of differential coefficients of friction on the seal is critical in the operation of the coupling and will be explained more fully later.

The diameter of the inner surface of the seal is different for each of two different embodiments of the invention. In the first embodiment, the diameter is nearly identical to the outer diameter of the spigot, allowing insertion of the spigot into the seal with the application of minimal longitudinal force and creating a snug frictional engagement with little or no normal force therebetween.

In the second embodiment the diameter of the inner surface of the seal is smaller than the outer diameter of the spigot by a considerable amount. Thus a substantial longitudinal force is required to force the spigot into the seal and subsequently a substantial normal force is created therebetween. The assembly and mode of operation of both forms of the invention are substantially the same.

OPERATION

The sequence of assembly of the coupling is shown in FIGS. 2-5. FIG. 6 illustrates the forces present in the first embodiment of the coupling and FIG. 7 illustrates the forces present in the second embodiment.

Considering the first embodiment, the seal 18 is inserted into socket 19 of the bell and the spigot 14 is inserted into the terminal portion of the socket, as shown in FIG. 2. When the spigot is moved into the bell, FIG. 3, it pushes the seal rearwardly in the socket to a position against step 22, thus preventing further rearward movement of the seal. Continued insertion of the spigot to engagement with a step 38 causes it to be inserted into the seal, as shown in FIG. 4. Since, in the first embodiment, the seal is dimensioned to engage the spigot snugly, when the spigot is withdrawn from the bell the seal moves with the spigot until contact is made with the inclined surface 24 of the bell socket, FIG. 5. With the coefficient of friction $\mu_2$ greater than that of $\mu_1$, when the spigot is withdrawn further from the bell the seal will continue to move with it causing the seal to become tightly wedged between the socket and the spigot.

Referring to FIG. 6, by balancing the horizontal and vertical forces and equating $F_2 \mu_2$ to P, which insures self-locking, the following relationship between $\mu_1$, $\mu_2$ and $\theta$ can be developed and the coupling will be self locking whenever:

$$\mu_2 \geq \frac{\sin\theta + \mu_1 \cos\theta}{\cos\theta - \mu_1 \sin\theta}$$

When this equation is satisfied and when some initial contact pressure exists between the seal and the spigot to insure that initial motion of the spigot will develop a drag force on the seal, then the coupling will self lock and must be destroyed before the pipe lengths can be separated.

As a practical matter, $\theta$ preferably should be between 5° and 10° with 7° being the optimum. This provides a good compromise between a small angle, which gives the ultimate insurance against slippage, and a large angle, which creates the least induced hoop stress in the seal under axial loading of the pipe.

As shown in the graph of FIG. 8, when a 7° slope is used and $\mu_1$, for example, is 0.60 then the coupling will self-lock whenever $\mu_2$ is 0.77 or greater. Both of these coefficients of friction are within the range obtainable with polyvinylchloride pipe and a rubber seal with a typical surface coating applied to one side. By decreasing the angle $\theta$, the two coefficients of friction can be made closer to one another simplifying manufacture of the seal. However, as noted above a small angle produces high induced hoop stress in the seal.

The second embodiment is assembled in the same manner as the first, except that the inner diameter of the seal is made smaller than the outer diameter of the spigot, creating an interference fit therebetween. Thus a substantial end force P is required between the spigot and the bell to expand the seal and force the spigot into it. Preferably the interference should be to the maximum extent feasible for the particular materials utilized.

The initial engagement results in the development of a normal pressure between spigot and seal. This pressure multiplied by the area of contact gives a normal force $F_n$ between seal and spigot. Referring to FIG. 7, if this normal force is taken into account when solving the force balance equations, a relationship is developed between $P$, $F_n$, $\mu_1$, $\mu_2$ and $\theta$ wherein the coupling will be self-locking when:

$$\mu_2 \geq \frac{\sin\theta + \mu_1 \cos\theta}{\left(1 + \frac{F_n}{P}\mu_1\right)\cos\theta - \left(\mu_1 - \frac{F_n}{P}\right)\sin\theta}$$

It will be noted that by increasing the preload $F_n$ between the spigot and seal the value of $\mu_2$ can be closer to that of $\mu_1$ for a given angle $\theta$, or else for a given ratio of $\mu_1$ to $\mu_2$ the angle $\theta$ can be made larger. Thus the coupling of the second embodiment creates less stringent design constraints in order to insure self locking than the coupling of the first embodiment. For example, with an angle $\theta$ of 7°, a maximum separating force $P$ of 30 lbs., and a normal force $F_n$ of 50 lbs., if $\mu_1$ is 0.5 then $\mu_2$ only need be 0.56, or 10 percent greater than $\mu_1$, to prevent disengagement. By way of comparison, if there was no initial interference $\mu_2$ would have to be at least 0.66.

It will be noted that in the limiting cases ($F_n = 0$ and $P = \alpha$) the above relationship reduces to the form derived for the first embodiment. However, in either embodiment once a coupling is constructed with the correct parameters it is self-locking and must be destroyed, or requires the use of a special tool in order to disassemble the pipes.

Having thus described my invention in preferred embodiments, I claim:

1. A self-locking pipe coupling for joining the adjacent ends of a pair of pipe sections, comprising
   a. a cylindrical spigot portion (16) arranged at one end of a first one of said pipe sections;
   b. a bell portion (10) arranged at one end of a second one of said pipe sections, said bell portion including, in succession,
      1. a cylindrical terminal portion (26) having a diameter for receiving said spigot portion,
      2. a truncated conical portion (24) of increasing diameter in the direction toward the other end of said second pipe, said truncated portion defining an angle $\phi$ relative to the axis of said second pipe,
      3. a first radially inwardly directed step (22) terminating said truncated portion,
      4. a cylindrical inner socket portion (20) having a diameter generally equal to the diameter of said terminal portion, and
      5. a second step (38) terminating said inner socket portion and merging into the remaining portion of said second pipe; and
   c. a resilient cylindrical seal (18) arranged concentrically within said truncated portion and having an inner diameter for snugly receiving said spigot portion and an outer surface conforming with the inner surface of said truncated bell portion, said seal having a length less than the distance between said cylindrical terminal portion and said first step, said seal having an inner coefficient of friction $\mu_2$ between its inner surface and the outer surface of said spigot, and an outer coefficient of friction $\mu_1$ between its outer surface and the inner surface of said bell truncated portion, where $\mu_2$ is greater than but less than twice $\mu_1$, and where $$\mu_2 = \frac{\sin\theta + \mu_1 \cos\theta}{\cos\theta - \mu_1 \sin\theta},$$

whereby upon axial insertion of said spigot portion concentrically within said bell portion and said seal, said seal is caused to abut said first step and said spigot portion is caused to abut said second step, so that said seal has a first interference — fit position relative to said spigot portion;
   d. said first pipe being axially displaced apart from said second pipe to cause the seal in said first position relative to said spigot portion to be tightly wedged in sealed relation between the inclined inner surface of said bell truncated conical portion and said spigot portion.

2. The pipe coupling of claim 1 wherein $\theta$ is between 5° and 10° and $\mu_1/\mu_2$ is between 0.70 and 0.90.

* * * * *